Figure 1:
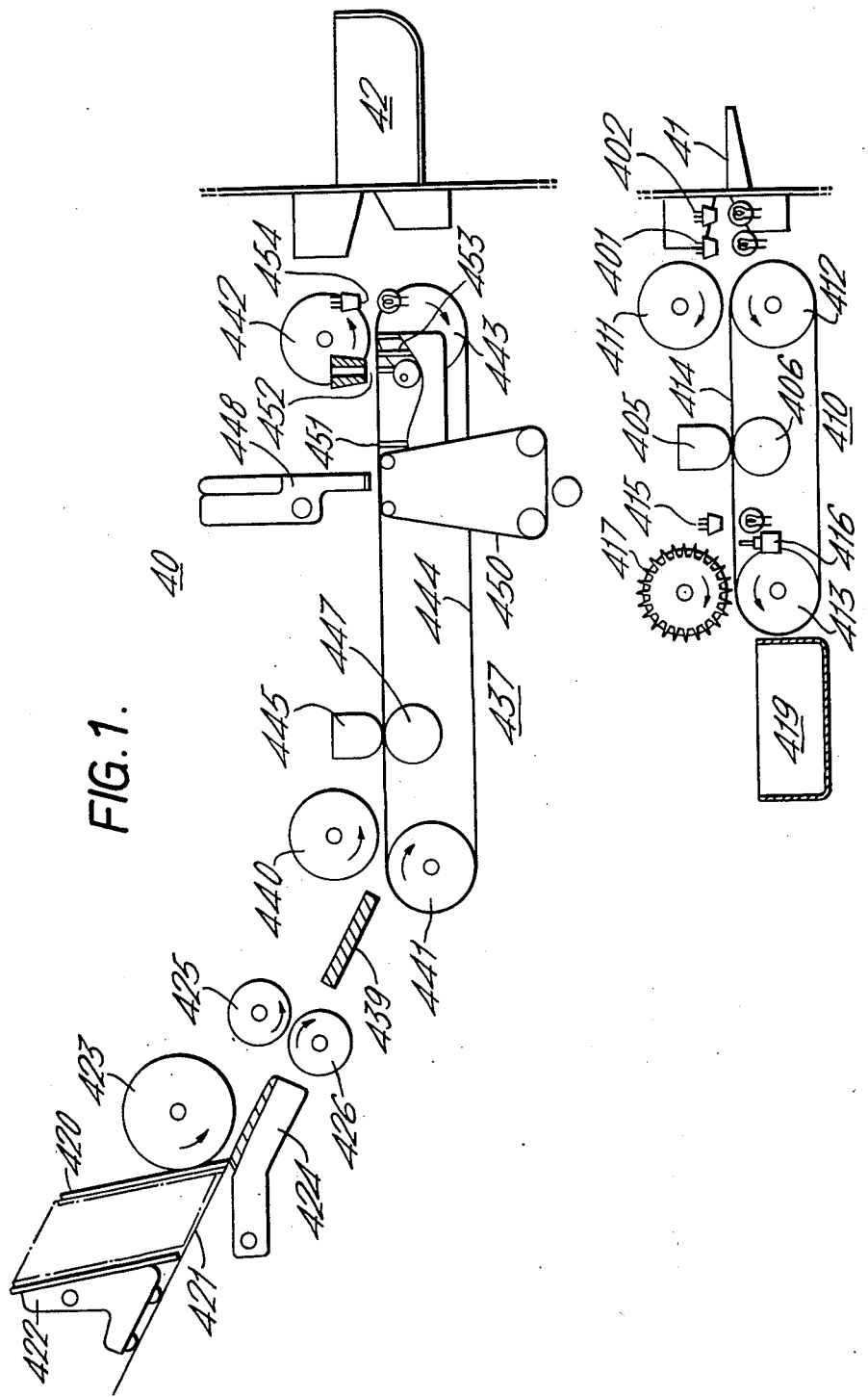

United States Patent [19]

Oka et al.

[11] 3,984,660
[45] Oct. 5, 1976

[54] APPARATUS FOR ISSUING A CARD HAVING A PREDETERMINED MONETARY VALUE

[75] Inventors: Akira Oka, Muko; Noriaki Minami, Shimahon; Sigehiro Kondou, Choshi; Hirosi Nakatsuka, Arashiyamayaku; Hirosi Egasira, Katsura; Mamoru Hirayama, Takatsuki; Yasunori Hayasi, Nagaokakyo; Kazunobu Otsukawa, Oharano, all of Japan

[73] Assignee: Omron Tateisi Electronics Company, Kyoto, Japan

[22] Filed: May 23, 1974

[21] Appl. No.: 472,744

[30] Foreign Application Priority Data
May 31, 1973 Japan............................. 48-61497

[52] U.S. Cl. ..................... 235/61.7 B; 235/61.8 A
[51] Int. Cl.² ................................. G06K 21/00
[58] Field of Search ................. 235/61.8 A, 61.7 B

[56] References Cited
UNITED STATES PATENTS

| | | | |
|---|---|---|---|
| 3,287,543 | 11/1966 | Halpern | 235/61.8 A |
| 3,356,021 | 12/1967 | May et al. | 235/61.8 A |
| 3,609,300 | 9/1971 | Halpern | 235/61.8 A |

*Primary Examiner*—Vincent P. Canney
*Attorney, Agent, or Firm*—Christensen, O'Connor, Garrison & Havelka

[57] ABSTRACT

An apparatus is described for issuing cards having recorded thereon a predetermined monetary value, which cards can be used by a customer to purchase tickets which are usable in automatic ticket gates of a commutation system. The apparatus receives, retains and invalidates a card presented by the customer and dispenses, from a supply of blank cards, a new card on which is recorded a monetary value equal to that of the card which has been presented plus that of any cash that has been presented to the apparatus. This monetary value may be magnetically recorded and may also be visually displayed by means of human-readable symbols imprinted on the card.

20 Claims, 2 Drawing Figures

APPARATUS FOR ISSUING A CARD HAVING A PREDETERMINED MONETARY VALUE

This invention relates to an apparatus for issuing a card having a predetermined monetary value.

In a copending application, the present inventors have proposed a system in which a stored value card, that is, a card having a predetermined monetary value previously given thereto is used to purchase from a card-actuated automatic ticket vending machine a ticket which can be used in an automatic ticket gate at, say, a railway station.

The stored value card is previously given to each customer, and each time he uses the card in the ticket machine, the fare of the ticket purchased is subtracted from the value recorded on the card and the result of subtraction is recorded on the card in place of the previous value thereon.

The card can be repeatedly used in the ticket machine so long as it has any remaining value.

The ticket purchased with the card can be used in an ordinary automatic ticket gate in which those tickets which are purchased from a coin-actuated ticket vending machine or at a ticket window, or commutation tickets can also be used. Therefore, it is not necessary to provide a particular gate for exclusive use with the stored value card. This is a great advantage.

The primary object of the invention is to provide an apparatus for issuing to a customer a card which has a monetary value corresponding to the value of the money presented by the customer.

Another object of the invention is to provide an apparatus for issuing to a customer a card having an extra monetary value in addition to the value of the money presented by the customer.

Another object of the invention is to provide an apparatus for issuing to a customer a card having a monetary value corresponding to the sum of the value of the money and the value remaining on the old card both presented by the customer.

The card issuing machine of the invention is provided with input means through which the data expressing the value of the money paid by a customer are fed into the machine. When the customer presents both money and his card having a remaining monetary value, a reader reads the remaining monetary value of the card, which is added to the value of the money paid, so that the result of the addition is recorded on a new card, which is then given to the customer. The old card presented by the customer is then invalidated.

A plurality of cards on which no monetary value has yet been recorded are stored in the machine, and when the machine is operated, one of the card is taken out and sent to the recorder, which records on the card the monetary value to be given to the card so that the recorded data can be read by a reader provided in an automatic ticket vending machine in which the card is used to purchase a ticket therefrom. The data are usually magnetically recorded and also is visible symbols so that the holder of the card can conveniently know the present value of his card.

Figure 2:
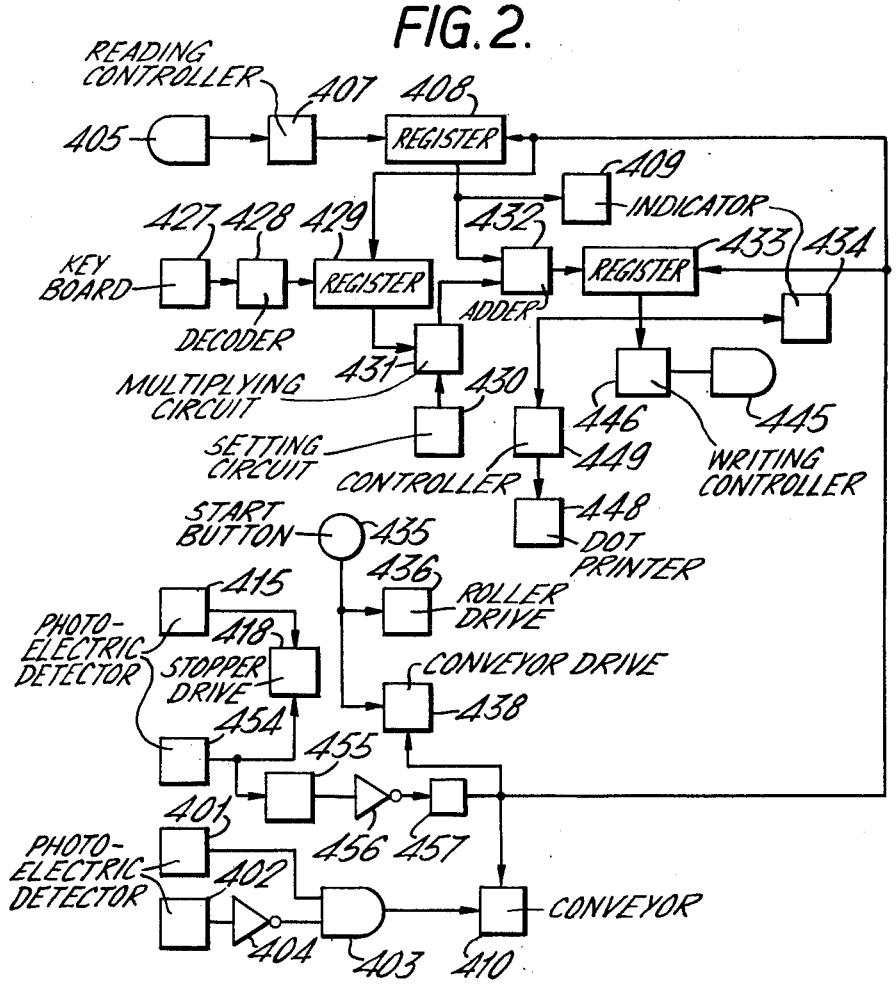

The invention will be further explained with reference to the accompanying drawings, wherein;

FIG. 1 is a schematic view of the mechanism of the apparatus of the invention; and FIG. 2 is a block diagram of the control circuit of the mechanism of FIG. 1.

Referring now in detail to the drawings, there is shown a card inlet 41 (FIG. 1) into which the holder of a stored value card (to be referred to merely as a card) inserts the card. Just behind the inlet 41 there are provided a first photoelectric detector 401 which detects the inserted card to produce a detection signal and a second photoelectric detector 402 which detects a hole in the card to produce a signal. This hole is provided in the card to regulate the direction in which the card is to be inserted into a card-actuated automatic ticket vending machine.

The output from the photoelectric detector 401 is applied to one input of an AND element 403, (FIG. 2) to the other input of which the output of the photoelectric detector 402 is applied through a NOT element 404.

when the card is put into the inlet 41, its forward edge contacts an upper roller 411 and a lower pulley 412 provided behind the photoelectric detectors 401 and 402 so that farther insertion of the card is prevented.

If the card has been inserted in the proper direction, the photoelectric detector 401 produces an output but the other detector 402 does not, whereupon the NOT element 404 produces an output so that the AND element 403 receives a signal at both its input terminals to produce an output.

The output of the AND element 403 actuates a card conveyer 410, which pulls the card into the machine. The conveyer 410 continues its movement until a reset signal is received. The conveyer 410 comprises the upper roller 411 and the lower pulley 412, a lower pulley 413 farther inside, a cutter roller 417 above the pulley 417 which cuts the card and puts it into a receptacle 419, a belt 414 connecting the pulleys 412 and 413, and a drive (not shown) for moving the roller 411, the pulleys 412 and 413 and the cutter roller 417.

Above the belt 414 and behind the roller 411 and the pulley 412 there is provided a magnetic head 405 which reads the data magnetically recorded on the card as it is being conveyed on the conveyer 410. A pressure roller 406 is provided facing the magnetic head 405 to improve contact between the card and the head 405. The head 405 is controlled by a reading controller 407 to read the data expressing the existing monetary value the card has. The data read by the magnetic head are stored in a register 408. On the basis of the stored data an indicator 409 indicates the existing monetary value of the card.

On the other hand, the card that has passed the magnetic head 405 is detected by a photoelectric detector 415 provided behind the magnetic head 405. The output signal of the detector 415 actuates a drive 418 for a stopper 416 disposed immediately behind the detector 415, whereupon the stopper 416 projects in the path of the card to stop the card in front of the cutter roller 417.

A plurality of new cards 420 to be issued which have no data recorded thereon as yet are stored on an inclined surface 421. The cards stand on their respective one edge aslant from their vertical position, making a certain angle with the inclined surface 421 and are pressed forwardly downward by a pressing member 422 so that the foremost card is borne against a feed roller 423. Below the roller 423 there is provided a pad 424 with a surface having a high frictional resistance facing the roller 423 so as to prevent simultaneous feeding of two cards.

Forwardly below the feed roller 423 there are provided a pair of guide rollers 425 and 426 and then a guide plate 439.

When asked by a customer, the operator of the machine strikes the keys on a keyboard 427 in accordance with the cash presented by the customer to input into the card issuing device the data expressing the monetary value to be given to the card to be issued. The input data are stored in a register 429 through a decoder 428 and then applied to an arithmetic circuit which comprises a multiplying circuit 431 and an adding circuit 432. The multiplying circuit 431 multiplies the value stored in the register 429 by a value which is set in a setting circuit 430 and which is greater than 1, and the adding circuit 432 adds the output from the multiplying circuit to the value stored in the register 408.

The multiplying circuit is to obtain a monetary value corresponding to the value of the cash paid by the customer multiplied by a predetermined rate. Suppose that the customer has paid $10. If the value of $10 is multiplied by 1.1 and the resulting value of $11 is granted to a card to be issued, the customer will receive a card having the monetary value of $11 for the $10 he has actually paid. This means addition of an extra value of $1 or about 9% discount.

The adding circuit 432 is to add to the monetary value remaining in the old card the customer has presented to the machine to the monetary value of the new card to be issued.

The output from the adding circuit is stored in a register 433 as the monetary value to be given to the new card to be issued, and the value is indicated in an indicator 434.

Then the operator presses a start button 435, whereupon a drive 436 is actuated to rotate the feed roller 423, and the upper and lower guide rollers 425 and 426 for a predetermined period of time and at the same time a drive 438 is actuated to start a card conveying device 436. The drive 436 operates until the card has passed the guide rollers 425 and 426.

If two cards have been sent out in succession, a stopper may be provided to hold the succeeding card, or the succeeding card may be deflected by any suitable means.

The card conveyer 437 comprises the upper and lower rollers 425 and 426, and upper roller 440 and a lower pulley 441 which receive the card from the guide plate 439 and move it toward the tray 42, an upper roller 442 and a lower pulley 443 behing the tray 42, and a belt 444 connecting the pulleys 441 and 443.

The new card being conveyed by the conveyer 437 passes a magnetic writing head 445 provided above the belt and in front of the roller 440 and the pulley 441. The head 445 is controlled by a writing controller 446 to record at a predetermined position on the card the monetary value stored in the register 433. A pressure roller 447 faces the head to urge the card thereagainst.

As the card is farther conveyed, a stopper 451 is moved by a suitable drive not shown to project in the path of the card to stop it, and a dot printer 448 having an ink ribbon 450 is controlled by a controller 449 to print the monetary value stored in the register 433 on the card in visible figures.

The card on which the monetary value has now been recorded is farther conveyed till it is stopped by a stopper 453 which has been moved by a suitable drive, not shown, to project in the path of the card, whereupon a puncher 452 provided in front of the dot printer 448 and behind the roller 442 and the pulley 443 punches out a hole at a predetermined position on the card. This hole is formed to indicate that the card is usable in a card-actuated ticket vending machine and also indicate the direction in which the card is to be introduced into the machine.

After the hole has been formed, the conveyer 437 sends out the card unto the tray 42. A photoelectric detector 454 is provided between the forward end of the conveyer 437 and the tray 42 to detect the card that has been sent out.

When the detector 454 has detected the card, the drive 418 of the stopper 416 that has until then been holding the old card is deenergized to retract the stopper 416 out of the way of the old card, whereupon the conveyor 410 conveys the old card to be cut by the cutter roller 417 and then put into the receptacle 419. With the arrangement that the old card is disposed of only after the new card has been issued, even if the new card should be damaged by misoperation of the machine or for some other cause as it is being conveyed and taken out of the machine by the operator, it is easily possible to pull out the old card from the machine inlet 41, and again insert it into the machine to produce a new card from the start.

The cutter roller 417 is provided to destroy the old card so that it cannot be used again.

The output from the photoelectric detector 545 is also applied to a monostable multivibrator 455, which produces an output having a predetermined width which corresponds to the time period from when the photoelectric detector 454 produced an output till the old card has been put into the receptacle. The trailing edge of the signal from the multivibrator 455 is taken out through a NOT element 456 and a differentiator 457. The output from the differentiator 457 resets the registers 408, 429, 433 and the drive 438 for the conveyers 410 and 437, thereby restoring the card issuing machine to the original condition.

In the illustrated embodiment, in order to grant an extra monetary value to the card in addition to the normal value which corresponds to the money paid, the multiplying circuit 431 multiplies the normal value by a preset number greater than 1. It is also possible to determine the multiplier in accordance with the fare of the card, or to add a preset extra value to the normal value of the card.

A magnetic reading head may be provided to check, after the monetary value has been recorded on the card, if the magnetic recording has been correctly made.

What we claim is:

1. An apparatus for receiving and dispensing cards capable of having recorded thereon a predetermined monetary value and which are useful in purchasing tickets in automatic ticket gates in commutation systems, said apparatus comprising:

a. means for receiving and retaining a first card which is presented to said apparatus by a customer, said first card having recorded thereon a first monetary value, said receiving and retaining means including means defining an inlet to said apparatus through which said first card is to be inserted, a receptacle for retaining said first card, and means for conveying said first card from said inlet to said receptacle;

b. first means for reading and storing said first monetary value, said first means being located along said conveying means between said inlet and said receptacle;

c. second means for entering and storing a second monetary value corresponding to the value of money presented to the apparatus by the customer;

d. third means for calculating and storing from said first and said second monetary values a third monetary value;

e. means for recording said third monetary value on a second card;

f. means for dispensing said second card to the customer, and g. means for invalidating said first card after said first monetary value has been read therefrom, said invalidating means being located along said conveying means between said first means and said receptacle.

2. An apparatus as recited in claim 1, wherein said receiving and retaining means further includes means located between said first means and said invalidating means along said conveying means for stopping the passage of said first card along said conveying means until said dispensing means had dispensed said second card.

3. An apparatus as recited in claim 1, further comprising means for visually indicating said first monetary value to the customer.

4. An apparatus as recited in claim 1, further comprising means for visually indicating said third monetary value to the customer.

5. An apparatus as recited in claim 1, wherein said recording means records said third monetary value on said second card in a machine-readable code.

6. An apparatus as recited in claim 5, wherein said recording means additionally records said third monetary value on said second card in human-readable symbols.

7. An apparatus as recited in claim 6, wherein said recording means includes a dot printer for printing said third monetary value on said second card in alphanumeric, human-readable symbols.

8. An apparatus as recited in claim 5, wherein each of said cards includes a magnetic recording medium in which said monetary values are capable of being recorded and wherein said recording means magnetically records said third monetary value on said second card.

9. An apparatus as recited in claim 1, wherein each of said cards include a magnetic medium in which said monetary values are capable of being recorded, and wherein said first means includes means for magnetically reading said first monetary value from said first card.

10. An apparatus as recited in claim 9, wherein said recording means magnetically records said third monetary value on said second card.

11. An apparatus as recited in claim 1, wherein said third means adds said first monetary value to said second monetary value to obtain said third monetary value.

12. An apparatus for receiving and dispensing cards capable of having recorded thereon a predetermined monetary value and which are useful in purchasing tickets in automatic ticket gates in commutation systems, said apparatus comprising:

a. means for receiving and retaining a first card which is presented to said apparatus by a customer, said first card having recorded thereon a first monetary value;

b. first means for reading and storing said first monetary value;

c. second means for entering and storing a second monetary value corresponding to the value of money presented by the customer;

d. third means for calculating and storing from said first and said second monetary values a third monetary value;

e. means for recording said third monetary value on a second card;

f. means for dispensing said second card to the customer, said dispensing means including enabling means for supplying a control signal as said second card is dispensed to the customer; and g. means for invalidating said first card, said invalidating means responsive to said control signal supplied by said enabling means for invalidating said first card only after said second card has been dispensed to the customer.

13. An apparatus as recited in claim 12 wherein said dispensing means comprises a second receptacle containing a plurality of said second cards, means defining an outlet in said apparatus through which said second cards are to be dispensed, a second means for conveying said second cards one at a time from said second receptacle to said outlet, said recording means being located between said second receptacle and said outlet along said second conveying means, and wherein said enabling means includes means located between said recording means and said outlet along said second conveying means for detecting the passage of each said second card on said second conveying means.

14. An apparatus as recited in claim 13, further comprising means for resetting said first, second and third means in response to said detecting means.

15. An apparatus as recited in claim 12, further comprising means for visually indicating said first monetary value to the customer.

16. An apparatus as recited in claim 12, further comprising means for visually indicating said third monetary value to the customer.

17. An apparatus for receiving and dispensing cards capable of having recorded thereon a predetermined monetary value and which are useful in purchasing tickets in automatic ticket gates in commutation systems, said apparatus comprising:

a. means for receiving and retaining a first card which is presented to said apparatus by a customer, said first card having recorded thereon a first monetary value;

b. first means for reading and storing said first monetary value;

c. second means for entering and storing a second monetary value corresponding to the value of money presented by the customer;

d. third means for calculating and storing from said first and said second monetary values a third monetary value, said third means including means for increasing said second monetary value above the value of the money presented by the customer;

e. means for recording said third monetary value on a second card;

means for dispensing said second card to the customer, and g. means for invalidating said first card after said first monetary value has been read therefrom.

18. An apparatus as recited in claim 17, wherein said increasing means includes means for multiplying said second monetary value by a predetermined number greater than unity.

19. An apparatus as recited in claim 17, further comprising means for visually indicating said first monetary value to the customer.

20. An apparatus as recited in claim 17, further comprising means for visually indicating said third monetary value to the customer.

* * * * *